Patented Dec. 26, 1939

2,184,883

UNITED STATES PATENT OFFICE 2,184,883

COMPOSITION OF MATTER AND METHOD OF MAKING SAME

Irving E. Muskat, Akron, and Albert G. Chenicek, Barberton, Ohio, assignors to Pittsburgh Plate Glass Company, Allegheny County, Pa., a corporation of Pennsylvania No Drawing. Application December 15, 1937, Serial No. 179,956

16 Claims. (Cl. 23—190)

This invention relates to certain halogenated amides and a method of producing these compounds, and is particularly directed to chlorinated compounds such as may be derived from the chlorination of polymers of cyanamide.

It is well known to chlorinate certain organic compounds to obtain compositions containing enough active chlorine to be suitable for use in bleaching and sterilizing processes. Considerable difficulty has been encountered in the discovery of stable compounds which contain sufficiently high concentrations of active chlorine and are sufficiently soluble in various media to permit their use as a source of available chlorine.

In accordance with our invention, we have discovered certain novel chlorinated compounds which may be used as a source of active chlorine. We have found that soluble, stable compositions of high active chlorine content, preferably upwards of 40% active chlorine, may be prepared by chlorination of certain compounds which may be regarded as derivatives of cyanamide. Of particular interest are the products obtained by the chlorination of dicyandiamide and melamine, the dimer and trimer, respectively, of cyanamide or mixtures containing one or both of these compounds. It is found that when these materials are chlorinated, solid compositions which are stable over a period of many months, which contain as much as 100 percent active chlorine and which are sufficiently soluble in aqueous and alkaline solutions, are produced. These products appear to be mixtures containing corresponding N-chloro derivatives wherein one or more hydrogen atoms in the molecule have been replaced by chlorine atoms.

It is also found that compounds of high active chlorine content and of good stability may be prepared by treatment of certain salts and organic derivatives of melamine and dicyandiamide with chlorine. Certain substituted melamines, such as hydroxy melamines or alkyl substituted or aryl substituted melamine, which may be considered as belonging to the melamine series of compounds may be chlorinated to form very stable products of sufficient solubility and content of available chlorine to permit their use as bleaching or sterilizing agents. For example, desirable products may be obtained by the chlorination of sodium, lithium, potassium or calcium or other alkali or alkaline earth salts of melamine or organic, or amino, or cyano-organic derivatives thereof, such as the N-methylated, N-ethylated or other N-acylated or alkylated compounds of melamine.

In a similar manner, it has been determined that compounds of dicyandiamide such as the sodium, potassium, calcium or other alkali or alkaline earth salts thereof or organic derivatives of dicyandiamide may be chlorinated to yield products which serve as suitable sources of available chlorine.

If desired, these compounds may be chlorinated in the pure stated, but this is in no way necessary and very often it may be desirable to chlorinate mixtures wherein melamine and/or dicyandiamide is an ingredient. For example, products of high stability and high active chlorine content may be obtained by treatment of cyanamide or its salts under conditions such that polymerization of the cyanamide occurs to form quantities of dicyandiamide and/or melamine. This polymerized mixture may then be chlorinated with or without substantial separation of the dicyandiamide or melamine from the mixture.

This process may be carried out by treatment of salts or other hydrolyzable compounds of cyanamide whereby the compound may be hydrolyzed to yield cyanamide before or during polymerization. Thus, in accordance with our invention, we are able to produce a product of high active chlorine content and high stability in a simple and very inexpensive manner without recourse to the extensive purification processes which are generally regarded as necessary in the preparation of chlorinated organic compounds. For example, calcium, sodium or potassium cyanamide may be dispersed in an aqueous medium and treated under conditions such that hydrolysis of the product to cyanamide and polymerization of the cyanamide is secured. This product may then be chlorinated under suitable temperatures and a stable chlorination product thereof may be obtained.

Similarly, cyanamide itself may be heated or otherwise treated to form a polymerized material. A very satisfactory method for securing such polymerization has been to dissolve cyanamide in water and to gently heat the solution. However, the cyanamide may be dispersed in other liquids and polymerized or may be polymerized in the dry state or in any other suitable manner.

If desired, the chlorinated product may be purified by suitable means, for example, by crystallization after chlorination, but this is in no way necessary as it may be advantageous to use the chlorinated mixture per se.

The chlorination may be effected in any convenient manner as, for example, by chlorination in the dry state or by chlorination of fluid dispersions of the materials. Such dispersions may be in the form of true solutions, colloidal solutions or suspensions of the materials to be chlorinated.

The following examples illustrate our invention:

*Example I.*—An aqueous slurry containing 75 grams per liter of melamine was prepared and a stream of chlorine was bubbled through the slurry for a period of two hours. The temperature was maintained at 25° C. and a slurry of white crystalline solid was produced. This slurry was filtered and the washed residue was found to contain 74 percent active chlorine. The solid product was found to be fairly soluble in water, more soluble in alkaline solutions and remained stable for a period of many months.

*Example II.*—An aqueous slurry containing 65 grams per liter of melamine and 58 grams per liter of calcium hydroxide was chlorinated in a similar manner with no attempt to control the temperature. The temperature of the slurry rose to 50° C. and after filtering, repulping, again filtering and washing the residue to remove the calcium chloride, a yellow-orange product containing 100° available chlorine and which contained substantially no calcium was obtained.

*Example III.*—An aqueous slurry containing 100 grams per liter of dicyandiamide was prepared and was chlorinated in a similar manner at a temperature of 0°-5° C. After filtration, a white product was obtained which was very stable and which contained 87 percent active chlorine. Four grams of this product dissolved in 100 cc. of water.

*Example IV.*—An aqueous suspension containing 200 grams per liter of crude calcium cyanamide was heated at a temperature of 45-50° C. for one half hour. The resulting solution was filtered and after partial neutralization thereof with sulphuric acid, was again filtered to remove precipitated calcium sulphate. The filtrate was then evaporated to dryness at a temperature of 80-85° C. 20 parts of the evaporated composition was dissolved in 150 parts of water and treated with a stream of chlorine at a temperature of 0-10° C. A stable orange-colored water soluble product containing 86 percent available chlorine was obtained.

The time and rate of chlorination of these compounds is capable of considerable variation and it is found that the amount of chlorine in the final product may be controlled to some degree by controlling these factors. Chlorination has been carried out at temperatures from 0° C. upward and it is found that to some extent, an increase in temperature may permit an increase in the amount of chlorine absorbed by the composition. In general, treatment at room temperature gives satisfactory results.

Since the chlorinated product is soluble in water, it will be apparent that the aqueous filtrate, such as may be obtained after removal of the slurry as in Examples I-III, may be substantially saturated with the chlorinated material. This solution may, if desired, be recycled for use as the aqueous medium in which other portions of material are to be chlorinated or may be used as a disinfecting, bleaching or sterilizing liquor.

The products may be mixed with various materials having alkaline reactions such as alkali metal hydroxides, carbonates or alkaline earth hydroxides or carbonates. The solubility of the chlorinated product appears to be increased in alkaline solutions, for example, in solutions containing sodium hydroxide, sodium bicarbonate or sodium carbonate. Often it may be desirable to chlorinate in the presence of these agents as illustrated in Example II.

These alkaline materials may form corresponding hypochlorites during chlorination and if desired, the cyanamide polymers may be chlorinated in the presence of substantial quantities of these substances to yield compositions of high stability and sterilizing or bleaching properties containing both the chlorinated polymer and a suitable hypochlorite. Mixtures containing chlorinated polymers of cyanamide such as chlorinated melamine or chlorinated dicyandiamide and hypochlorites appear to be more stable as to active chlorine content than the corresponding hypochlorites alone.

Chlorination in the presence of alkaline materials, suitably calcium hydroxide, sodium carbonate, etc., appears to promote the absorption of further quantities of chlorine.

In addition, it is sometimes advantageous to add certain other compounds such as phosphates or silicates to the composition before, during or after chlorination.

In preparing the material to be chlorinated from compounds of cyanamide, care should be taken to prevent excess decomposition or polymerization of the cyanamide. The polymers to be chlorinated may be prepared directly from cyanamide itself or they may be prepared indirectly by hydrolysis of compounds of cyanamide, for example, sodium or calcium cyanamide and polymerization of the hydrolysis product. If calcium cyanamide is used, the hydrolysis may result in the precipitation of substantial amounts of calcium hydroxide. The precipitate may be removed if desired, or a portion or all of it may be left in the mixture to be chlorinated, or the calcium salts may be converted to carbonates, as for example, by treatment of the dissolved cyanamide salt with carbon dioxide, and a portion or all of such carbonate may be left in the mixture during chlorination. If these precipitated materials are removed, it may be desirable to partially or wholly neutralize the aqueous solution with an acid or acid salt. Sulphuric acid or carbon dioxide may be used for this purpose and have the additional function of precipitating alkaline earth metals, thereby enabling the production of more pure material. Other similar agents capable of precipitating calcium salts may likewise be used. The temperature maintained during hydrolysis should be such that no substantial decomposition of cyanamide to form ammonia occurs. A temperature of 40-60° C. has been found to be suitable for this purpose, but other temperatures may be used if desired.

Polymerization may occur during hydrolysis or it may occur subsequently thereto. Slow heating and evaporation of the aqueous solution resulting from the hydrolysis of the salts of cyanamide has been found to result in satisfactory polymerization. Temperatures of 80-85° C. have been found suitable for this purpose, but higher and lower temperatures may be used in some cases. Polymerization may be carried out at atmospheric pressure but it is preferred to carry out the reaction at super-atmospheric pressures, preferably upward of 50 pounds per square inch.

While we have described the chlorination of these compounds by use of chlorine, it is obvious that other sources of chlorine, such as hypochlorous acids, chlorous acid, or the salts thereof, chlorine oxides such as chlorine monoxide, etc., may also be used.

These compounds prepared in accordance with our invention may be used as bleaching, sterilizing or disinfecting agents. Very desirable products of high sterilizing properties may be produced by mixing dispersions of these materials with detergent compositions such as soaps, phosphated or sulphated alcohols such as the sulphates and phosphates of octyl, lauryl, oleyl or hexyl alcohol; alkali metal phosphates such as trisodium phosphate or sodium hexametaphosphate, organic sulphonic acids or salts thereof, such as Turkey Red oil, isopropyl naphthalene sodium sulphonate or toluene sulphonic acid, etc., alkali metal carbonates, silicates, etc. Other uses thereof will occur to those skilled in the art.

Although the present invention has been described in connection with the specific details of certain embodiments thereof, it is not intended that such details shall be considered as limitations upon the scope of the invention except insofar as included in the accompanying claims.

We claim:

1. Chlorinated melamine characterized in that a substantial amount of the chlorine in said chlorinated melamine is present as active chlorine.

2. A chlorinated salt of melamine characterized in that a substantial amount of chlorine in said chlorinated salt is present as active chlorine.

3. A chlorinated compound of the melamine series characterized in that a substantial amount of chlorine in said chlorinated compound is present as active chlorine.

4. Chlorinated dicyandiamide characterized in that a substantial amount of chlorine in said chlorinated dicyandiamide is present as active chlorine.

5. A chlorinated dicyandiamide compound characterized in that a substantial amount of chlorine in said chlorinated compound is present as active chlorine.

6. A chlorinated polymer of cyanamide characterized in that a substantial amount of chlorine in said chlorinated polymer is present as active chlorine.

7. A composition of matter comprising the reaction product resulting from the polymerization of cyanamide and the chlorination of the polymerization product said composition being characterized in that a substantial amount of the chlorine in the composition is present as active chlorine.

8. A chlorinated polymer of cyanamide containing upwards of 40 percent active chlorine.

9. The process of preparing a composition of high active chlorine content which comprises chlorinating an aqueous dispersion of melamine.

10. The process of preparing a composition of high active chlorine content which comprises chlorinating an aqueous dispersion of dicyandiamide.

11. The process of preparing a composition of high active chlorine content which comprises treating melamine with a chlorinating agent.

12. The process of preparing a composition of high active chlorine content which comprises treating dicyandiamide with a chlorinating agent.

13. The process of preparing a composition of high active chlorine content which comprises chlorinating an aqueous dispersion of melamine in the presence of an alkaline material.

14. The process of preparing a composition of high active chlorine content which comprises chlorinating an aqueous dispersion of dicyandiamide in the presence of an alkaline material.

15. The process of preparing a composition of high active chlorine content which comprises treating a polymer of cyanamide with a chlorinating agent.

16. The process of preparing a composition of high active chlorine content which comprises chlorinating an aqueous dispersion of a polymer of cyanamide in the presence of an alkaline material.

IRVING E. MUSKAT.
ALBERT G. CHENICEK.